UNITED STATES PATENT OFFICE.

FRANK A. FAHRENWALD, OF CLEVELAND, OHIO.

PROCESS OF TREATING RUBBER.

1,269,168.  Specification of Letters Patent.  Patented June 11, 1918.

No Drawing.   Application filed October 11, 1916. Serial No. 125,009.

*To all whom it may concern:*

Be it known that I, FRANK A. FAHRENWALD, a citizen of the United States, residing at Cleveland, in the county of Cuyahoga and State of Ohio, have invented a certain new and useful Improvement in Processes of Treating Rubber, of which the following is a full, clear, and exact description, reference being had to the accompanying drawings.

This invention relates to the treatment of rubber and rubber containing compounds, and while it has particular reference to a process of reclaiming or revitalizing rubber, which has previously been cured by the use of sulfur or sulfur containing substances, it is not limited thereto, since raw rubber can be treated with equally satisfactory results.

Rubber is ordinarily prepared for use by the addition of varying degrees of sulfur or sulfur-containing substances under predetermined conditions of heat and pressure, whereby the rubber gum is afforded an increased amount of rigidity, and its adhesiveness as regards other objects is decreased, and apparently some kind of chemical combination between the rubber and the sulfur is effected, although neither the nature nor the extent of the reaction is important to this application. After rubber has once been treated with sulfur, it is difficult or impossible to remove the combined sulfur, although it is generally possible to add more sulfur. Accordingly, it has heretofore been the practice, in order to conserve the supply of rubber, to use the same originally, so far as possible, either in a pure gum state, or with the addition of the smallest possible amount of sulfur. After having served its purpose in this state, it is reworked with the addition of more sulfur, which process is repeated time after time, always with the addition of sulfur, until the product finally reaches a loose, brittle, almost friable condition, and has to be discarded. During all this time the rubber material itself persists.

I have discovered that if this perished, highly sulfurized rubber be treated with tellurium or tellurium containing substances, at a proper temperature, the tellurium is absorbed and the rubber is revitalized and rendered susceptible of a great many uses, to which only comparatively new rubber could ordinarily be applied. The technique of the operation is comparatively unimportant. I have effected the desired combination merely by mixing together rubber and tellurium in the proper proportions and treating this intimate mixture at a low sustained temperature. I apprehend that the tellurium may be employed in either the solid, liquid or gaseous state, either alone or combined. Thus, it may be used in the form of hydrogen tellurid, antimony tellurid, tellurium chlorid, and many other forms.

When tellurium is added, as aforesaid, to sulfurized rubber, it appears to replace the sulfur in its compound with the rubber, but I offer no explanation or theory to account for this. It may be either a direct combination of the tellurium with the rubber, excluding the sulfur; or it may be a compound of the tellurium with the rubber in addition to the sulfur; or it may be that the tellurium combines with the sulfur, and this combined substance reacts with the rubber in a new way. I apprehend, however, that the tellurium forms a true compound with the rubber, regardless of any reaction upon the sulfur, from the fact that the treatment of raw rubber by means of tellurium produces practically the same substance for all practical purposes, as though sulfur were present.

Whatever be the explanation or nature of the reaction, I have discovered that if rubber which has become so highly sulfurized as to be practically worthless commercially be treated with tellurium, as above described, the evil effects of excessive sulfuration are immediately decreased and the material becomes soft, flexible, elastic and resilient to a very remarkable degree. Also I find that such tellurized rubber, after having first served its purpose, may be again treated with yet more tellurium with the production of greater hardness, and thus fitted for a second mode of use. This practically doubles the available life of rubber, assuming that the raw rubber is first treated with sulfur in the usual manner.

Although I have found that raw rubber can be initially cured by means of tellurium, I do not at present advocate this practice, since the tellurium is necessarily more expensive than sulfur, and the resulting compound is not materially improved as to any use with which I am at present familiar. I apprehend that the major importance of this invention will be in the treatment of rubber which has already served some part of its cycle of usefulness in combination with sulfur, although I do not hereby disclaim any of the uses to which this invention may be susceptible.

As an example of a single feasible operation, I have taken 10 ounces of heavily sulfurized rubber and ½ ounce finely ground commercial tellurium, heated the same together for several hours at a pressure of 50 lbs. per sq. in. and a temperature of 250° C. in molds of the sort used for rubber articles. The product of this action has been a rubber article of very dark color, extremely high tensile strength, and extreme flexibility. The nature of the resulting material was much like that employed in commercial rubber bands, excepting that it was darker in color and not quite so easily stretched longitudinally.

Having thus described my invention, what I claim is:

1. The process of reclaiming sulfurized rubber, which consists in submitting it to the action of tellurium in the presence of heat with or without pressure.

2. The process of recuring sulfurized rubber or articles containing sulfurized rubber which consists in heating the same in contact with tellurium or a composition of matter containing tellurium.

3. In the process of treating sulfurized rubber, the step which consists in heating the same in contact with tellurium or a composition of matter containing tellurium.

4. A composition of matter containing rubber, sulfur and tellurium.

5. The process of reducing hardness and increasing the pliability and elasticity of sulfurized rubber which consists in heating the same in contact with tellurium or a compound thereof.

In testimony whereof I hereunto affix my signature.

FRANK A. FAHRENWALD.